(12) United States Patent
Roberts et al.

(10) Patent No.: US 9,830,041 B2
(45) Date of Patent: Nov. 28, 2017

(54) METHOD AND APPARATUS FOR PRESENTING MEDIA PROGRAMS

(71) Applicant: AT&T Intellectual Property I, LP, Atlanta, GA (US)

(72) Inventors: Linda Roberts, Decatur, GA (US); E-Lee Chang, Mableton, GA (US); Ja-Young Sung, Atlanta, GA (US); Natasha Barrett Schultz, Lawrenceville, GA (US); Robert King, Roswell, GA (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 434 days.

(21) Appl. No.: 13/751,211

(22) Filed: Jan. 28, 2013

(65) Prior Publication Data

US 2013/0179788 A1    Jul. 11, 2013

Related U.S. Application Data

(63) Continuation of application No. 12/617,979, filed on Nov. 13, 2009, now Pat. No. 8,387,088.

(51) Int. Cl.
*G06F 3/0481* (2013.01)
*H04N 7/173* (2011.01)
(Continued)

(52) U.S. Cl.
CPC ....... *G06F 3/0481* (2013.01); *H04N 7/17318* (2013.01); *H04N 21/236* (2013.01);
(Continued)

(58) Field of Classification Search
CPC ............ G06F 3/0481; H04N 21/44213; H04N 21/44218; H04N 21/44222; H04N 21/482; H04N 21/4826
See application file for complete search history.

(56) References Cited

U.S. PATENT DOCUMENTS 5,223,924 A    6/1993  Strubbe
5,920,694 A    7/1999  Carleton
(Continued)

OTHER PUBLICATIONS

"Avatar Theater—Experimental TV Lab at Georgia Lab", http://etv.gatech.edu/ projects/avatar-theater/, Jan. 20, 2010, 2 pages.
(Continued)

*Primary Examiner* — Andrey Belousov
*Assistant Examiner* — Seth A Silverman
(74) *Attorney, Agent, or Firm* — Guntin & Gust, PLC; Joseph Hrutka

(57) ABSTRACT

A system that incorporates teachings of the present disclosure may include, for example, a computing device, including a controller to: transmit a client program having a graphical user interface to a media device operating in an interactive television network, wherein the client program presents a symbolic overlay that superimposes onto media content received by the media device and enables the media device to associate commentary with the media content received at the media device; and present the commentary by symbolic representations in a carrousel format within a window of the presentation of the symbolic overlay and in a vicinity of the media content. Other embodiments are disclosed.

17 Claims, 8 Drawing Sheets

(51) Int. Cl.
*H04N 21/236* (2011.01)
*H04N 21/431* (2011.01)
*H04N 21/442* (2011.01)
*H04N 21/4788* (2011.01)
*H04N 21/658* (2011.01)
*H04N 21/81* (2011.01)

(52) U.S. Cl.
CPC ... *H04N 21/23614* (2013.01); *H04N 21/4312* (2013.01); *H04N 21/4314* (2013.01); *H04N 21/44222* (2013.01); *H04N 21/4788* (2013.01); *H04N 21/6582* (2013.01); *H04N 21/8133* (2013.01)

(56) References Cited

U.S. PATENT DOCUMENTS

| | | | |
|---|---|---|---|
| 6,272,231 B1 | 8/2001 | Maurer | |
| 6,357,042 B2 | 3/2002 | Srinivasan | |
| 6,438,579 B1 | 8/2002 | Hosken | |
| 6,567,797 B1 | 5/2003 | Schuetze | |
| 6,580,811 B2 | 6/2003 | Maurer | |
| 6,732,146 B1 | 5/2004 | Miyake | |
| 6,792,412 B1 | 9/2004 | Sullivan | |
| 6,948,131 B1 | 9/2005 | Neven | |
| 7,031,931 B1 | 4/2006 | Meyers | |
| 7,051,352 B1 | 5/2006 | Schaffer | |
| 8,566,353 B2* | 10/2013 | Fink | G06F 17/3082 707/705 |
| 2002/0010759 A1 | 1/2002 | Hitson et al. | |
| 2002/0059094 A1 | 5/2002 | Hosea | |
| 2002/0097265 A1 | 7/2002 | Kurapati | |
| 2002/0144273 A1* | 10/2002 | Reto | H04L 29/06027 725/86 |
| 2002/0162107 A1 | 10/2002 | Gutta | |
| 2002/0178057 A1 | 11/2002 | Bertram | |
| 2002/0193066 A1 | 12/2002 | Connelly | |
| 2002/0194586 A1 | 12/2002 | Gutta | |
| 2002/0199194 A1 | 12/2002 | Ali | |
| 2003/0005439 A1* | 1/2003 | Rovira | H04N 7/163 725/37 |
| 2003/0066068 A1 | 4/2003 | Gutta | |
| 2003/0101450 A1* | 5/2003 | Davidsson | G06Q 10/10 725/32 |
| 2003/0234805 A1 | 12/2003 | Toyama | |
| 2004/0003392 A1 | 1/2004 | Trajkovic | |
| 2004/0064526 A1 | 4/2004 | Lee | |
| 2005/0144632 A1 | 6/2005 | Mears | |
| 2005/0149974 A1 | 7/2005 | Norman | |
| 2006/0020614 A1 | 1/2006 | Kolawa | |
| 2006/0026502 A1 | 2/2006 | Dutta | |
| 2006/0075355 A1* | 4/2006 | Shiono | G06F 3/04812 715/778 |
| 2006/0168150 A1 | 7/2006 | Naik | |
| 2006/0190966 A1 | 8/2006 | McKissick | |
| 2006/0218481 A1 | 9/2006 | Adams, Jr. | |
| 2006/0259355 A1 | 11/2006 | Farouki | |
| 2006/0271997 A1 | 11/2006 | Jacoby | |
| 2006/0288041 A1 | 12/2006 | Plastina | |
| 2007/0011039 A1 | 1/2007 | Oddo | |
| 2008/0218582 A1* | 9/2008 | Buckler | H04N 7/15 348/14.08 |
| 2008/0263458 A1* | 10/2008 | Altberg | H04L 12/66 715/757 |
| 2008/0312949 A1 | 12/2008 | Nagasaka et al. | |
| 2009/0063995 A1 | 3/2009 | Baron et al. | |
| 2009/0138828 A1 | 5/2009 | Schultz et al. | |
| 2009/0144626 A1 | 6/2009 | Appelman et al. | |
| 2009/0183100 A1* | 7/2009 | Eom | G06F 3/0482 715/769 |
| 2009/0300475 A1* | 12/2009 | Fink | G06F 17/3082 715/230 |
| 2010/0073454 A1 | 3/2010 | Lovhaugen et al. | |
| 2010/0095211 A1* | 4/2010 | Kenvin | G11B 27/034 715/723 |
| 2010/0228560 A1* | 9/2010 | Balasaygun | G06F 17/30876 705/1.1 |
| 2010/0228825 A1* | 9/2010 | Hegde et al. | 709/204 |
| 2010/0306655 A1 | 12/2010 | Mattingly et al. | |
| 2011/0145753 A1 | 6/2011 | Prakash | |
| 2012/0198334 A1 | 8/2012 | Surin et al. | |

OTHER PUBLICATIONS

"Netflix Party on XBox Live", http://www.youtube.com/watch?v=_FuPxEC8Tfc&feature=related, Jan. 20, 2010.

Chorianopoulos, , "Content-Enriched Communication—Supporting the Social Uses of TV", 10-page article, The Journal of The Communications Network, vol. 6, Part 1, Jan.-Mar. 2007, 10 pages.

Coppens, , "AmigoTV: Towards a Social TV Experience", Alcatel Bell R&I Residential Networked Applications, 4-page article, Apr. 1, 2004.

Khadraoui, , "Interactive TV Show Based on Avatars", IEEE: Systems Communications, 2005, Proceedings, Aug. 17, 2005, pp. 192-197.

Luyten, , "Telebuddies: Social Stitching with Interactive Television", Hasselt University—Transnationale Universiteit Limburg, Belgium, 6-page article, CHI 2006, Apr. 22-27, 2006.

Nathan, , "CollaboraTV: Making Television Viewing Social Again", pp. 85-94, axTV'08, Oct. 22-24, 2008.

Oehlberg, , "Designing for Distributed, Sociable Television Viewing", Stanford University, Mechanical Engineering, Palo Alto Research Center, 10-page article, May 2006.

Weisz, , "Watching Together: Integrating Text Chat with Video", Carnegie Mellon University/University of Minnesota, 10-page article, CHI 2007, Apr. 28-May 3, 2007.

www.youtube.com, , "NXE Dashboard, Aug. 11 Update Preview Program—Netflix Party", 2-page article, http://www.youtube.com/watch?v=2brb-gCt2ss, web site last visited Jan. 20, 2010.

* cited by examiner

500

600

METHOD AND APPARATUS FOR PRESENTING MEDIA PROGRAMS

CROSS-REFERENCE TO RELATED APPLICATIONS

This application is a continuation of and claims priority to U.S. patent application Ser. No. 12/617,979 filed Nov. 13, 2009, which is incorporated herein by reference in its entirety.

FIELD OF THE DISCLOSURE

The present disclosure relates generally to media presentation techniques and, more specifically, to a method and apparatus for presenting media programs.

BACKGROUND OF THE DISCLOSURE

Consumers have a number of venues to access media content. For example, consumers can view video content supplied by social networking portals such as MySpace™ FaceBook™, and YouTube™ over an Internet browser. Similarly, consumers can view via a set-top box video content supplied by an Internet Protocol Television (IPTV) communication system, a satellite TV communication system, and/or a cable TV communication system. Other forms of media content such as audio content, pictures, articles, or combinations thereof can also be accessed by consumers over a public network such as the Internet.

Consumers can share with others their thoughts about media content they have consumed by word of mouth, text messaging (e.g., email), or other forms of common communication.

DETAILED DESCRIPTION OF THE DRAWINGS

One embodiment of the present disclosure can entail a method, including: presenting each of a plurality of users a media program; collecting one or more temporal actions initiated by the plurality of users while the media program is presented; creating one or more symbolic overlays corresponding to the one or more temporal actions of each user; combining the presentation of the media program with a presentation of the one or more symbolic overlays; presenting a depiction of one or more of the users in a carrousel format in the presentation of the one or more symbolic overlays. This application is related to U.S. patent application Ser. No. 12/146,131, filed Jun. 25, 2008, by Amento et al., entitled "Method and Apparatus for Presenting Media Programs." All sections of the aforementioned application are incorporated herein by reference.

Another embodiment of the present disclosure can entail a computer-readable storage medium, including a program for instructing a computer to: receive temporal actions initiated by a plurality of users while presenting media content to the plurality of users; combine a presentation of the media content with a presentation of a symbolic overlay generated from the temporal actions; and present a depiction of one or more of the users in a carrousel format of the presentation of the symbolic overlay.

Yet another embodiment of the present disclosure can entail a computing device, including a controller to: transmit a client program having a graphical user interface (GUI) to a media device operating in an interactive television (iTV) network, wherein the client program presents a symbolic overlay that superimposes onto media content received by the media device and enables the media device to associate commentary with the media content received at the media device; and present the commentary by symbolic representations in a carrousel format within a window of the presentation of the symbolic overlay and in a vicinity of the media content.

Figure 1:
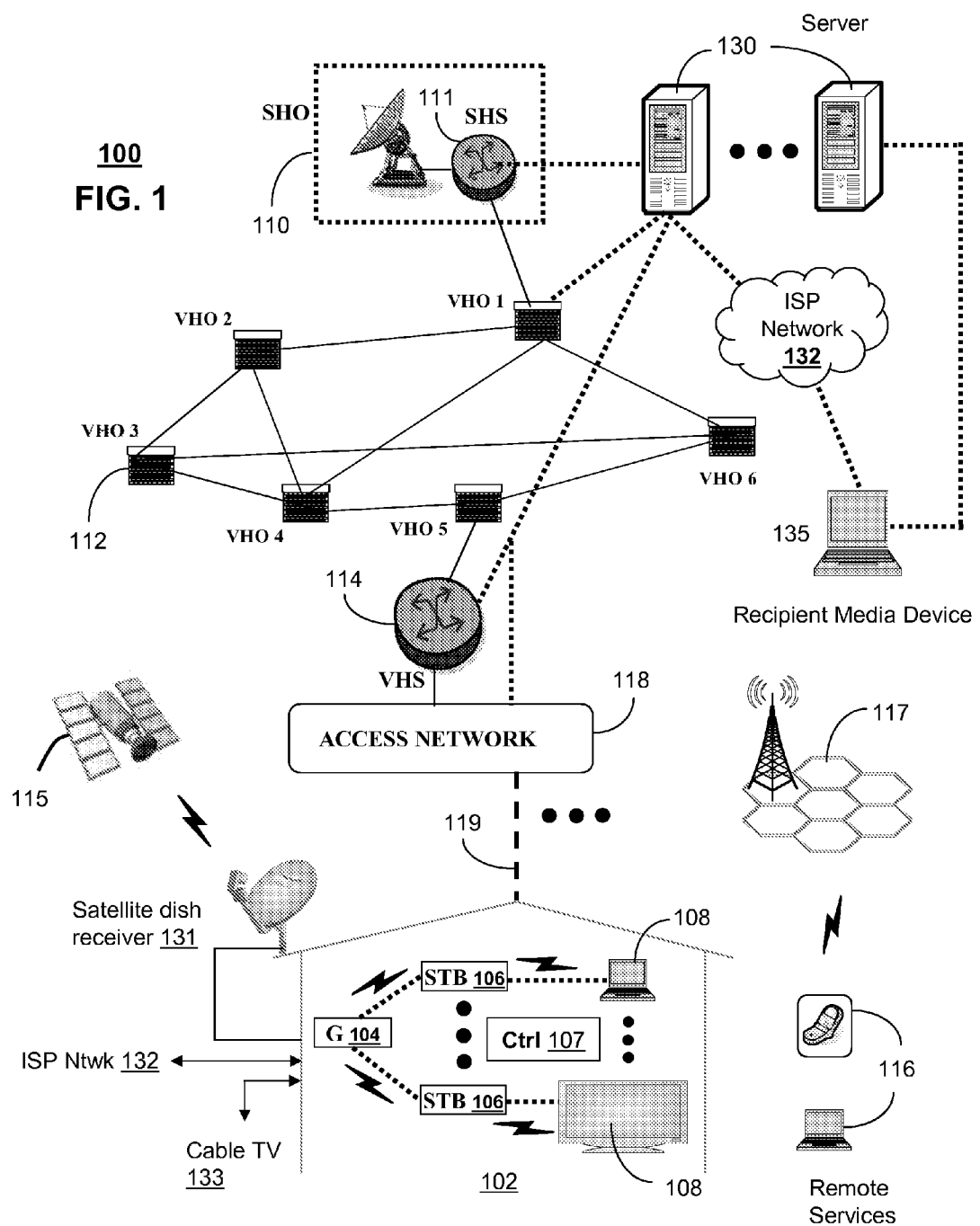
FIGS. 1-2 depict illustrative embodiments of communication systems that provide media services.

FIG. 1 depicts an illustrative embodiment of a first communication system 100 for delivering media content. The communication system 100 can represent an Internet Protocol Television (IPTV) broadcast media system. The IPTV media system can include a super head-end office (SHO) 110 with at least one super headed office server (SHS) 111 which receives media content from satellite and/or terrestrial communication systems. In the present context, media content can represent audio content, moving image content such as videos, still image content, or combinations thereof. The SHS server 111 can forward packets associated with the media content to video head-end servers (VHS) 114 via a network of video head-end offices (VHO) 112 according to a common multicast communication protocol.

The VHS 114 can distribute multimedia broadcast programs via an access network 118 to commercial and/or residential buildings 102 housing a gateway 104 (such as a common residential or commercial gateway). The access network 118 can represent a group of digital subscriber line access multiplexers (DSLAMs) located in a central office or a service area interface that provide broadband services over optical links or copper twisted pairs 119 to buildings 102. The gateway 104 can use common communication technology to distribute broadcast signals to media processors 106 such as Set-Top Boxes (STBs) which in turn present broadcast channels to media devices 108 such as computers or television sets managed in some instances by a media controller 107 (such as an infrared or RF remote control).

The gateway 104, the media processors 106, and media devices 108 can utilize tethered interface technologies (such as coaxial or phone line wiring) or can operate over a common wireless access protocol. With these interfaces, unicast communications can be invoked between the media processors 106 and subsystems of the IPTV media system for services such as video-on-demand (VoD), browsing an electronic programming guide (EPG), or other infrastructure services.

Some of the network elements of the IPTV media system can be coupled to one or more computing devices 130 a portion of which can operate as a web server for providing portal services over an Internet Service Provider (ISP) network 132 to wireline media devices 108 or wireless communication devices 116 by way of a wireless access base station 117 operating according to common wireless access protocols such as Wireless Fidelity (WiFi), or cellular communication technologies (such as GSM, CDMA, UMTS, WiMAX, Software Defined Radio or SDR, and so on).

The first communication system 100 can also include a recipient media device 135. The recipient media device 135 can be communicatively linked to the ISP network 132, the one or more computing devices 130, and to other devices in the system 100. The recipient media device 135 can be a STB, mobile device, personal computer, telephone, personal digital assistant (PDA), or other device capable of receiving and transmitting media content. Furthermore, the recipient media device 135 can be configured to be operative in an iTV network, which can include, but is not limited to including, IPTV, interactive cable television, and interactive satellite television.

The recipient media device 135 can be configured to transmit requests for media content and commentary associated with the media content from devices in the system 100. The commentary can be user-generated and can be in a temporal vicinity of the associated media content. The media content and associated commentary can come from devices such as, but is not limited to, STBs 106, media devices 108, and wireless communications device 116. The media content and associated commentary can include video content, audio content, still image content, text content, and other media content. Additionally, the recipient media device 135 can be configured to receive and respond to requests from devices in the system 100 for media content and commentary associated with the media content. In responding to the requests from the devices, the recipient media device 135 can transmit media content and commentary associated with the recipient media device 135 to the requesting devices.

Another distinct portion of the computing devices 130 can function as a server (herein referred to as server 130). The server 130 can use common computing and communication technology to perform the function of receiving, transmitting, maintaining, processing, and storing various types of content. As mentioned above, such content can include video content, audio content, still image content, text content, and other content. The server 130 can maintain a client program, which can be downloaded and/or accessed by the devices in the system 100. The client program can be configured to present an overlay that can be superimposed onto the media content and can allow users of the devices in the system 100 to associate a comment with media content received at the devices.

Additionally, the server 130 can be configured to receive requests for the media content and commentary associated with the media content from the devices in the system 100, such as the recipient media device 135 and the STBs 106. Furthermore, the server 130 can relay and/or store the actual media content and/or the commentary associated with the media content, and/or relay links to the media content and/or commentary associated with the media content to the devices in the system 100 requesting the content and/or commentary.

It will be appreciated by an artisan of ordinary skill in the art that a satellite broadcast television system can be used in place of the IPTV media system. In this embodiment, signals transmitted by a satellite 115 supplying media content can be intercepted by a common satellite dish receiver 131 coupled to the building 102. Modulated signals intercepted by the satellite dish receiver 131 can be submitted to the media processors 106 for generating broadcast channels which can be presented at the media devices 108. The media processors 106 can be equipped with a broadband port to the ISP network 132 to enable infrastructure services such as VoD and EPG described above.

In yet another embodiment, an analog or digital broadcast distribution system such as cable TV system 133 can be used in place of the IPTV media system described above. In this embodiment the cable TV system 133 can provide Internet, telephony, and interactive media services.

It follows from the above illustrations that the present disclosure can apply to any present or future interactive over-the-air or landline media content services.

Figure 2:
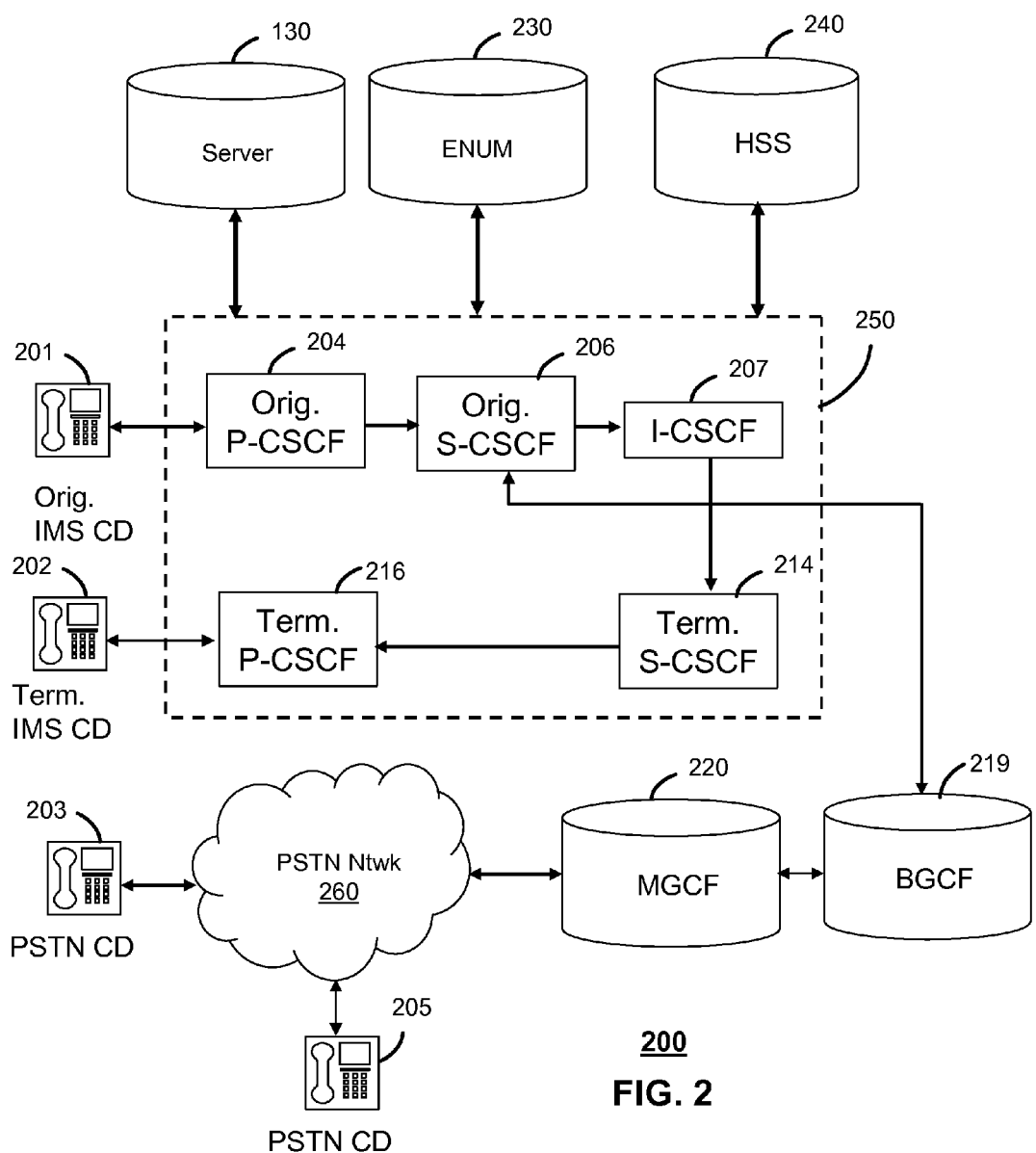

FIG. 2 depicts an illustrative embodiment of a communication system 200. employing an IP Multimedia Subsystem (IMS) network architecture to facilitate the combined services of circuit-switched and packet-switched systems. Communication system 200 can be overlaid or operably coupled with communication system 100 as another representative embodiment of communication system 100.

Communication system 200 can comprise a Home Subscriber Server (HSS) 240, a tElephone NUmber Mapping (ENUM) server 230, and other common network elements of an IMS network 250. The IMS network 250 can establish communications between IMS compliant communication devices (CD) 201, 202, Public Switched Telephone Network (PSTN) CDs 203, 205, and combinations thereof by way of a Media Gateway Control Function (MGCF) 220 coupled to a PSTN network 260.

IMS CDs 201, 202 can register with the IMS network 250 by contacting a Proxy Call Session Control Function (P-CSCF) which communicates with a corresponding Serving CSCF (S-CSCF) to register the CDs with at the HSS 240. To initiate a communication session between CDs, an originating IMS CD 201 can submit a Session Initiation Protocol (SIP INVITE) message to an originating P-CSCF 204 which communicates with a corresponding originating S-CSCF 206. The originating S-CSCF 206 can submit queries to the ENUM system 230 to translate an E.164 telephone number in the SIP INVITE to a SIP Uniform Resource Identifier (URI) if the terminating communication device is IMS compliant.

The SIP URI can be used by an Interrogating CSCF (I-CSCF) 207 to submit a query to the HSS 240 to identify a terminating S-CSCF 214 associated with a terminating IMS CD such as reference 202. Once identified, the I-CSCF 207 can submit the SIP INVITE to the terminating S-CSCF 214. The terminating S-CSCF 214 can then identify a terminating P-CSCF 216 associated with the terminating CD 202. The P-CSCF 216 then signals the CD 202 to establish communications.

If the terminating communication device is instead a PSTN CD such as references 203 or 205, the ENUM system 230 can respond with an unsuccessful address resolution which can cause the originating S-CSCF 206 to forward the call to the MGCF 220 via a Breakout Gateway Control Function (BGCF) 219. The MGCF 220 can then initiate the call to the terminating PSTN CD by common means over the PSTN network 260.

The aforementioned communication process is symmetrical. Accordingly, the terms "originating" and "terminating" in FIG. 2 are interchangeable. It is further noted that communication system 200 can be adapted to support video conferencing by way of common protocols such as H.323. In addition, communication system 200 can be adapted to provide the IMS CDs 201, 203 the multimedia and Internet services of communication system 100.

The server 130 of FIG. 1 can be operably coupled to the second communication system 200 for purposes similar to those described above.

Figure 3:
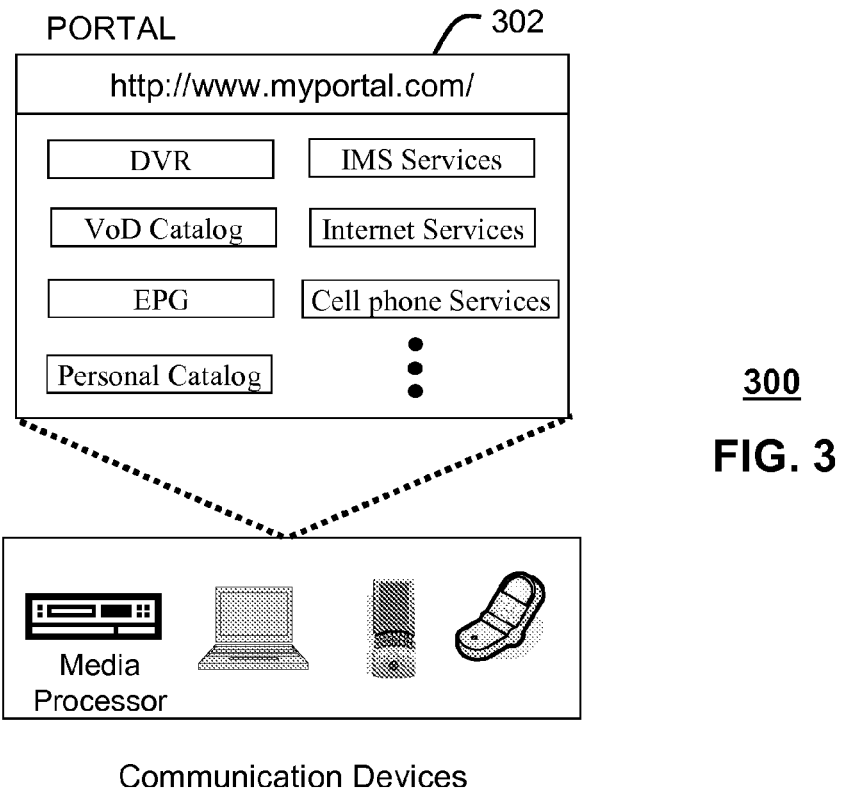
FIG. 3 depicts an illustrative embodiment of a portal interacting with the communication systems of FIGS. 1-2.

FIG. 3 depicts an illustrative embodiment of a portal 302 which can operate from the computing devices 130 described earlier of communication 100 illustrated in FIG. 1. The portal 302 can be used for managing services of communication systems 100-200. The portal 302 can be accessed by a Uniform Resource Locator (URL) with a common Internet browser such as Microsoft's Internet Explorer™ using an Internet-capable communication device such as those described for FIGS. 1-2. The portal 302 can be configured, for example, to access a media processor 106 and services managed thereby such as a Digital Video Recorder (DVR), a VoD catalog, an EPG, a personal catalog (such as personal videos, pictures, audio recordings, etc.) stored in the media processor, provisioning IMS services described earlier, provisioning Internet services, provisioning cellular phone services, and so on.

Figure 4:
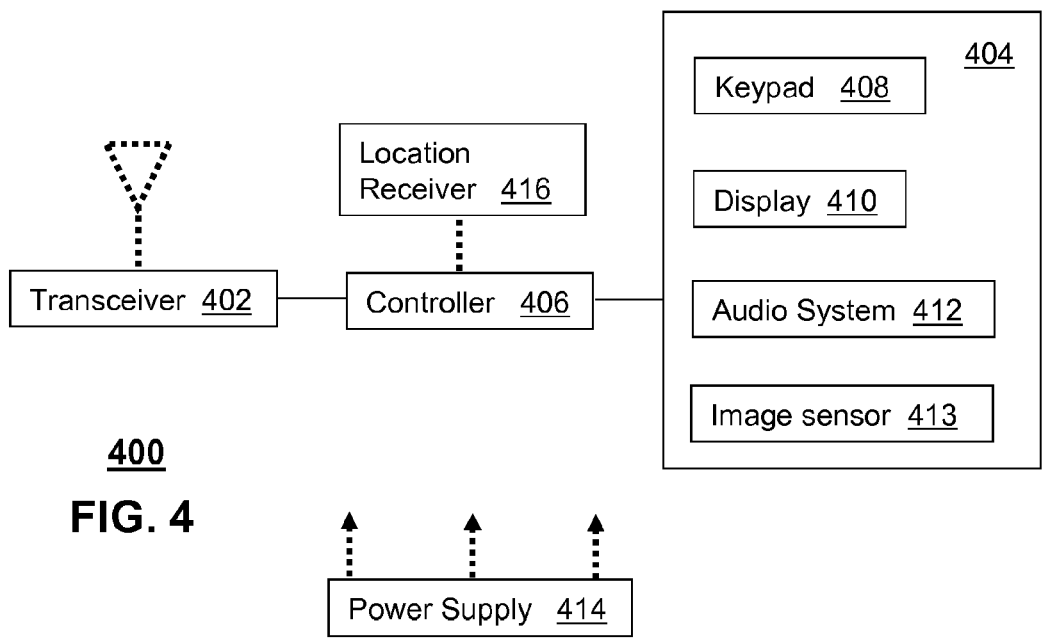
FIG. 4 depicts an illustrative embodiment of a communication device utilized in the communication systems of FIGS. 1-2.

FIG. 4 depicts an exemplary embodiment of a communication device 400. Communication device 400 can serve in whole or in part as an illustrative embodiment of the communication devices of FIGS. 1-2. The communication device 400 can comprise a wireline and/or wireless transceiver 402 (herein transceiver 402), a user interface (UI) 404, a power supply 414, a location receiver 416, and a controller 406 for managing operations thereof. The transceiver 402 can support short-range or long-range wireless access technologies such as Bluetooth, WiFi, Digital Enhanced Cordless Telecommunications (DECT), or cellular communication technologies, just to mention a few. Cellular technologies can include, for example, CDMA-1x, UMTS/HSDPA, GSM/GPRS, TDMA/EDGE, EV/DO, WiMAX, SDR, and next generation cellular wireless communication technologies as they arise. The transceiver 402 can also be adapted to support circuit-switched wireline access technologies (such as PSTN), packet-switched wireline access technologies (such as TCPIP, VoIP, etc.), and combinations thereof.

The UI 404 can include a depressible or touch-sensitive keypad 408 with a navigation mechanism such as a roller ball, joystick, mouse, or navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth. The keypad 408 can represent a numeric dialing keypad commonly used by phones, and/or a Qwerty keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400. In an embodiment where the display 410 is touch-sensitive, a portion or all of the keypad 408 can be presented by way of the display.

The UI 404 can also include an audio system 412 that utilizes common audio technology for conveying low volume audio (such as audio heard only in the proximity of a human ear) and high volume audio (such as speakerphone for hands free operation). The audio system 412 can further include a microphone for receiving audible signals of an end user. The audio system 412 can also be used for voice recognition applications. The UI 404 can further include an image sensor 413 such as a charged coupled device (CCD) camera for capturing still or moving images.

The power supply 414 can utilize common power management technologies such as replaceable and rechargeable batteries, supply regulation technologies, and charging system technologies for supplying energy to the components of the communication device 400 to facilitate long-range or short-range portable applications. The location receiver 416 can utilize common location technology such as a global positioning system (GPS) receiver for identifying a location of the communication device 400 based on signals generated by a constellation of GPS satellites, thereby facilitating common location services such as navigation.

The communication device 400 can use the transceiver 402 to also determine a proximity to a cellular, WiFi or Bluetooth access point by common power sensing techniques such as utilizing a received signal strength indicator (RSSI) and/or a signal time of arrival (TOA) or time of flight (TOF). The controller 406 can utilize computing technologies such as a microprocessor, a digital signal processor (DSP), and/or a video processor with associated storage memory such a Flash, ROM, RAM, SRAM, DRAM or other storage technologies.

The communication device 400 can be adapted to perform the functions of the media processor 106, the media devices 108, or the portable communication devices 116 of FIG. 1, as well as the IMS CDs 201-202 and PSTN CDs 203-205 of FIG. 2. It will be appreciated that the communication device 400 can also represent other common devices that can operate in communication systems 100-200 of FIGS. 1-2 such as a gaming console and a media player.

Figure 5:
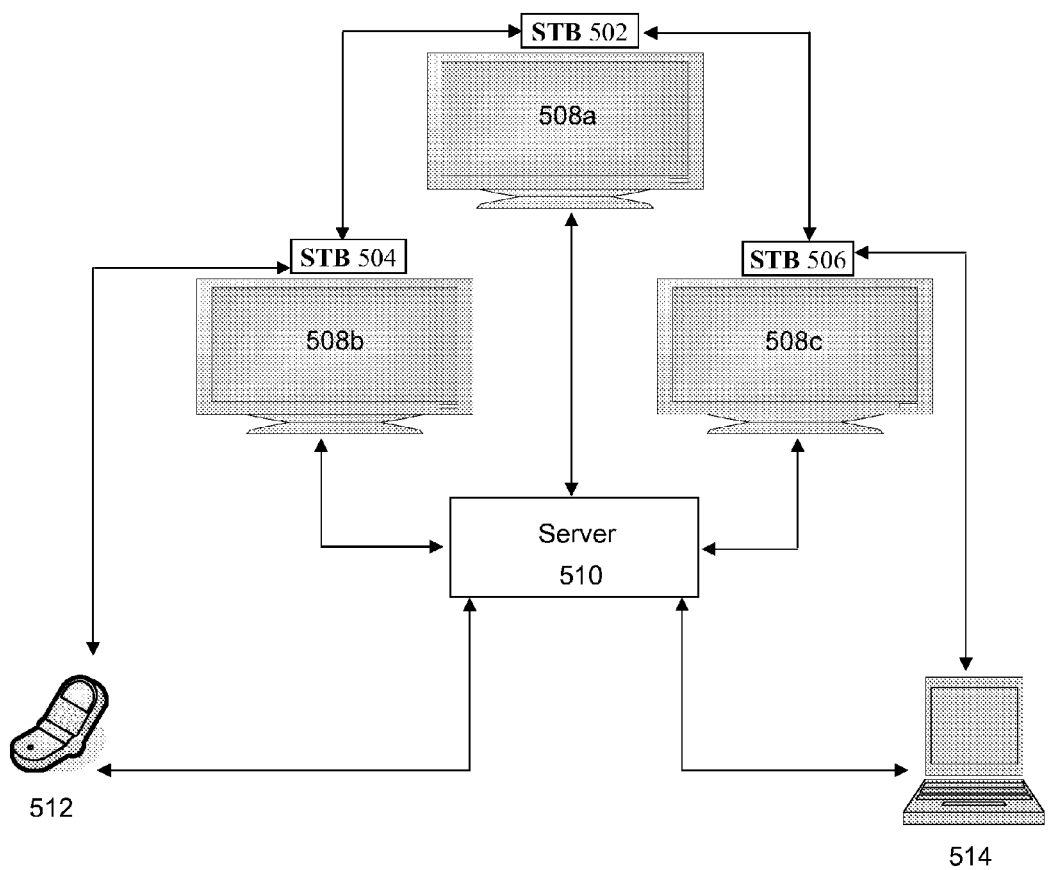
FIG. 5 depicts an illustrative embodiment of a system for transmitting media content, the system being operable in the communication systems of FIGS. 1-2.

FIG. 5 depicts an illustrative embodiment of a system 500 for transmitting media content, the system 500 being operable in portions of the communications systems of FIGS. 1-2. The system 500 can include one or more media devices 502, 504, and 506, which can be configured to deliver media content to display devices 508*a-c* and deliver and/or receive media content from server 510, communications device 512, and computing device 514. The media devices 502, 504, and 506 can be STBs or other similar media devices. The display devices 508*a-c* can include any device capable of displaying and/or playing media content such as televisions, cellular phones, personal digital assistants (PDA), computers, and the like. The server 510 can be a computing device including the operative features of server 130, among other features. The communications device 512 can include, for example, a mobile device, a cellular phone, wireless device, or other communications device and the computing device 514 can be a computer or laptop.

The server 510 can be utilized to communicatively link the media devices 502, 504, and 506 to the other devices of the system 500. The server 510 can be configured to receive, transmit, maintain, and store various types of media content. Additionally, the server 510 can include a client program, which can be accessed, downloaded, and/or otherwise utilized by the devices in the system 500. The client program can present an overlay that can be superimposed onto media content that is displayed and/or received at the devices in the system 500. Users of the client program can use the client program to associate commentary/comments with the media content accessed by the user.

Figure 6:
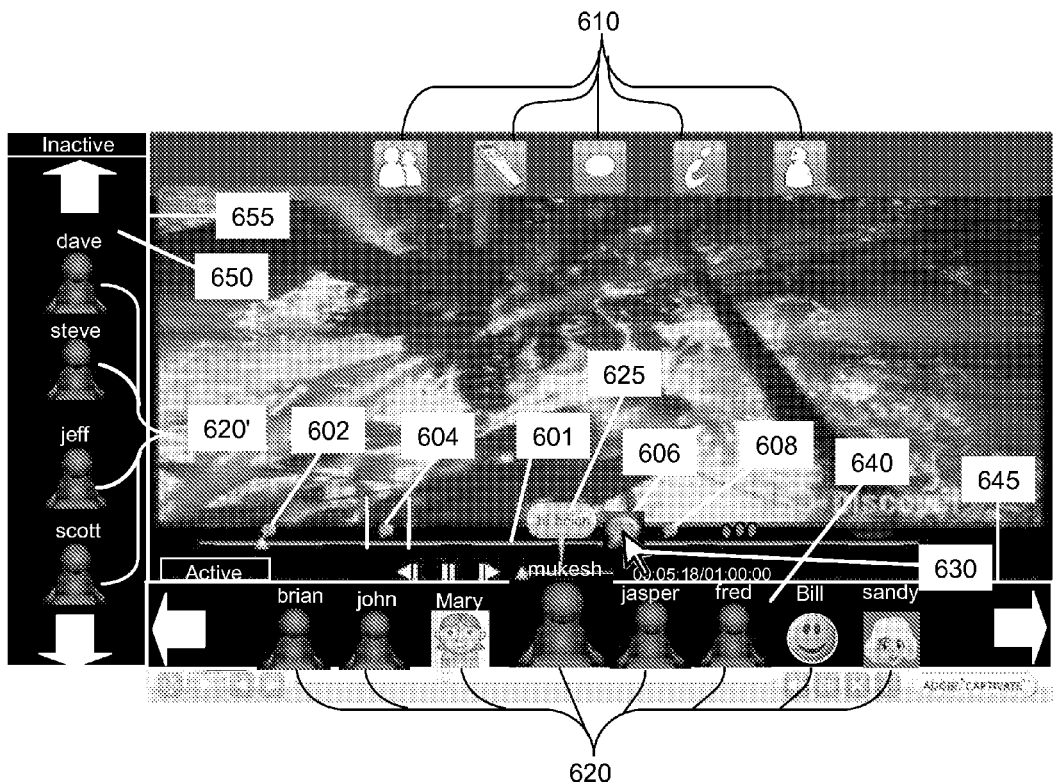
FIGS. 6 and 7*a*, 7*b* and 7*c* depict screenshots featuring a graphic user interface (GUI) in the form of an overlay illustrating commentary on a timeline associated with a media program.

FIG. 6 depicts a screenshot 600 illustrating an example of commentary on a timeline. The screenshot 600 features a graphic user interface (GUI) in the form of an overlay generated by the client program. As will be discussed in more detail below, the overlay can include menu buttons 610, symbols such as iconic symbols including but not limited to avatars 620 and callouts 625, and other operative controls which are featured on the screenshot 600. The overlay can include a timeline 601, which can reflect the entire duration of a media program playing at a user's media device.

As the screenshot 600 illustrates, comments have been inserted at various points in the timeline 601 of the media program. The iconic symbols such as colored spheres in the screenshot 600 can indicate that a comment has been inserted at that particular point in the timeline 601 of the media program. For example, a single comment 602, a single comment 604, a single comment 606, and four comments 608 have been inserted into the timeline 601. In this example, the comment 606 is highlighted by being enlarged or changing color when, for example, a mouse pointer 630 is placed over the comment symbol. Once the user-generated comments are associated with their respective media content, the user can utilize the client program to transmit the media content, commentary/comments, and/or links to the content and commentary to the server 510. The server 510 can be configured to access, store, and maintain the media content, commentary, and/or links to the media content and commentary. Additionally, the server 510 can be configured to maintain information about the media content and commentary. If only the links to the media content are sent to the server 510, the server 510 can be configured to identify and extract the actual media content associated with the link. Similarly, if only the links to the commentary are sent to the server 510, the server 510 can be configured to extract the actual commentary associated with the link.

The server 510 and/or the other devices in the system 500 can be configured to receive requests for the commentary and/or the media content from recipient media devices, which can be the devices in the system 500. For example, media device 502 can transmit a request to server 510 for media content and commentary from communications device 512. When the server 510 receives a request from a recipient media device, the server 510 can transmit at least a portion of the actual media content and commentary and/or the links to the media content and commentary to the recipient media device. If only the links are sent to the recipient media device, the recipient media device can access the media content and/or commentary via the links.

The recipient media device can then be configured to present the media content and/or commentary through a display device, such as display devices 508*a*-*c*. The users of the recipient media device can utilize the client program much like the users of the media devices generating the commentary. Additionally, user-generated commentary and media content can be generated at the recipient media device and can be transmitted to other devices in the system 500 that request the commentary and/or media content generated at the recipient media device.

In an embodiment, the server 510 can prompt a media device, such as media devices 502, 504, and 506, to set a range of the media content to be transmitted to the server 510. For example, the media device can set a range of the media content, which is thirty seconds before and thirty seconds after any commentary associated with the media content. The range can be defined by vertical start and end lines within the timeline of the media program that is presented by the client program, such as those surrounding comment 604 in FIG. 6. In another embodiment, the user of the media device can set the range without being prompted by the server 510. Moreover, the media device can temporally associate the user-generated comments with the media content according to timestamps associated with the requests. For example, if there is a timestamp at thirty seconds into a movie for a particular request, the media device can insert or otherwise associate the comment at that point in the movie.

In an embodiment, the server 510 and/or other devices of the system 500 can be configured to identify clusters of comments in a media program. A user of a media device, such as media device 502, can cause the media device to request an identification of clusters with the most frequent commentaries in a media program. The user can request to export one or more of the clusters that are identified by the server 510. Much like as described above, each cluster can be exported with a range of the media program starting before the first comment and ending sometime after the last comment in the cluster. Referring again to FIG. 6, the server 510 can identify that there is a cluster of four comments 608 in the particular media program. The cluster of four comments 608 and a range of the media content associated with the four comments 608 can be sent to the media device requesting the identification of the cluster.

In an embodiment, as shown in FIG. 6 the symbolic overlay can include depictions, symbolic representations or iconic symbols 620 comprising one of an avatar representation (see Mukesh) of each user, a live webcam image (see Sandy) of each user, a still picture (see Mary) of each user, or an animation (see Aaron, Tim or Jake in FIG. 7A) of each user, or combinations thereof, wherein one or more temporal actions of the user are expressed by way of one of the avatar representations of each user, the live webcam image of each user, the still picture of each user, or the animation of each user, or combinations thereof. The gesture of the avatar corresponds to a motion of a body of the avatar, and the expression of the avatar comprises at least one of a plurality of expressions (see, for example, Bill having a happy face in FIG. 6).

The related U.S. patent application Ser. No. 12/146,131, mentioned above discloses a GUI which presents, for example, a virtual theater audience which represents at least a portion of a plurality of users, one or more of which can provide comments or commentary with respect to a media program or media content. As shown in FIG. 6, an embodiment consistent with the present invention provides a GUI in the form of an overlay generated by the client program and which presents a depiction of one or more of the users (such as but not limited to buddies in a buddy list) in a carrousel format of the presentation of the symbolic overlay. By carrousel format, Applicants are referring to a format wherein the depictions, symbolic representations, or iconic symbols of one or more users who are providing comments or commentary with respect to a particular media content are arranged to rotate into view within, for example, a window provided as part of the symbolic overlay. The carrousel format can present one or more carrousels in either a horizontal position or a vertical position, or a combination thereof. Thus, in a horizontal position, the depictions rotate like a merry-go-round into view as shown by carrousel 640 in window 645, whereas in a vertical position, the depictions rotate like a Ferris wheel into view as shown by carrousel 650 in window 655.

Active users within a carrousel may be distinguished by at least one of highlighting with color, appearing larger in size, flashing, shaking, spinning, vibrating, or combinations thereof. As shown in FIG. 6, carrousel 640 is an active user carrousel and, for example, Mukesh is shown larger in size since his avatar depiction 620 is speaking based on input, for example, typed in or keyed in by Mukesh. Thus, for example, the highlighting event or effect can be triggered when an active user begins to type his or her comments. In an embodiment, the depiction 620 of a user within the active carrousel 640 can be moved automatically by the client program to a more prominent position in the carrousel 640 so as to be visible when the user provides comments regarding the media content. Moreover, a user can manually reorder the depictions or iconic symbols representing the users by dragging and dropping a particular iconic symbol. Alternatively, the client program can automatically reorder the iconic symbols representing the users based on a measured participation of a particular user. Moreover, a user can manually scroll through the depictions 620 in carrousel 640 by clicking on the left or right arrows in window 645, or scroll through the carrousel 650 by clicking on the top or bottom arrows in window 655.

Figure 7A:
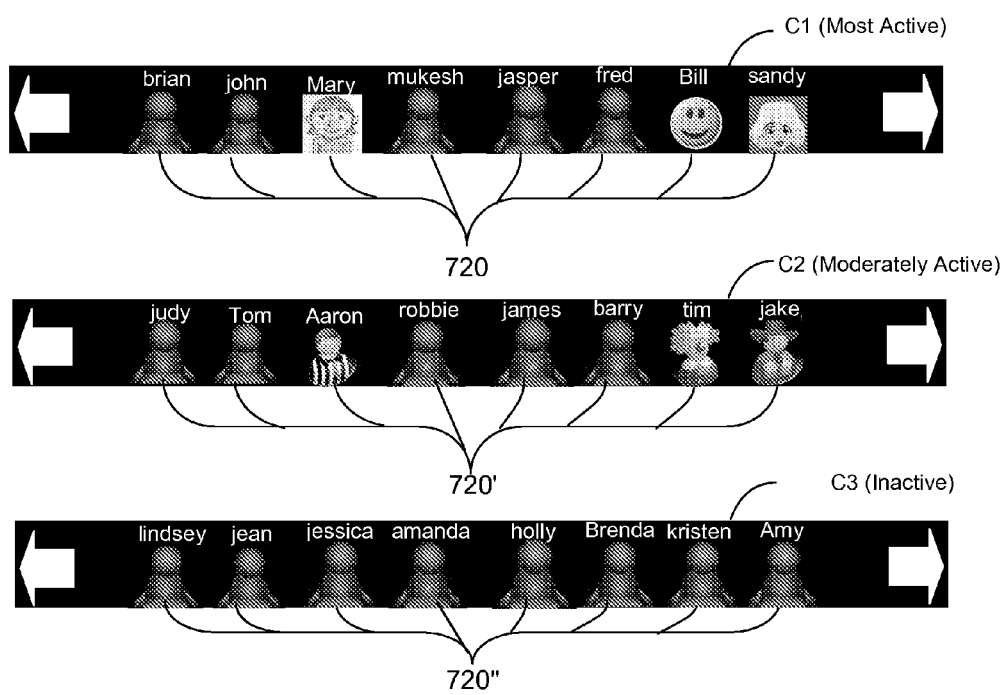

In an embodiment, the carrousel format can present multiple rows of carrousels to distinguish between users 720 who are most active, users 720' who are moderately active, and users 720" who are inactive. FIG. 7A shows an example of multiple rows C1, C2 and C3 of carrousels wherein each row represents varying degrees of participation by the users 720, 720', and 720". On the other hand, FIG. 6 shows the separate vertical carrousel 650 having inactive users 620' located therein. In either case, a user can invite additional users onto a carrousel such as carrousel 640 that is most active by, for example, clicking on the depictions or iconic symbols for the additional users, or by clicking and dragging the depictions or iconic symbols for the additional users. Moreover, an inactive carrousel can be minimized on the user's screen so as to not be in view.

Figure 7B:
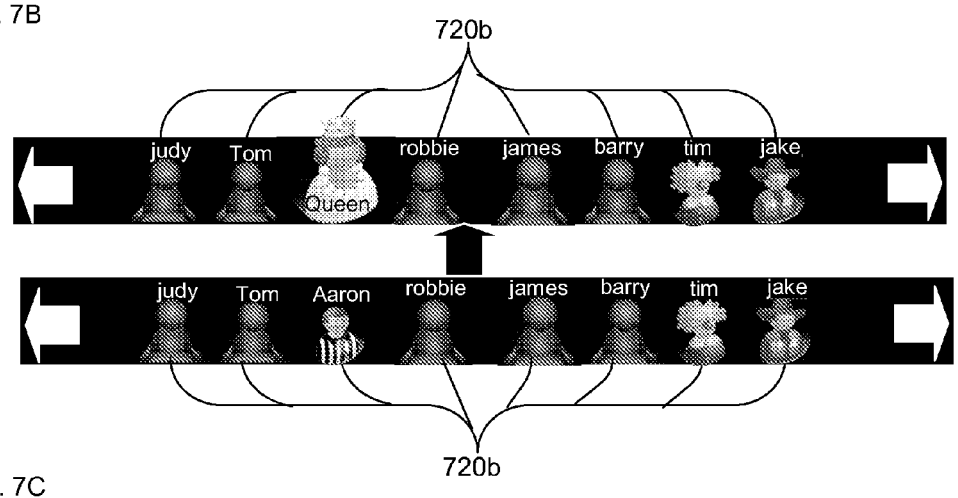
Figure 7C:
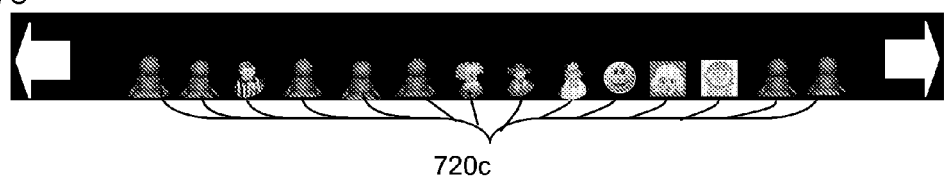

In an embodiment, if a particular carrousel has depictions or iconic symbols for user participants hidden in the lineup because there is not enough viewing area within a respective window such as windows 645 or 655, a user's avatar 620, for example, can be moved up in the lineup order by the client program when he or she participates by making a comment about the media content. For example, as shown in FIG. 7B, the Queen has been moved up in the lineup order of the depictions 720b based on her participation and has replaced Aaron in position next to Robbie. The Queen representation is also shown enlarged based on her active participation. If the user's avatar is already visible in the lineup, then the user's avatar would not have to move up in the lineup. Alternatively, multiple carrousels can be created to make room for more active participants, and/or the size of the depictions or iconic symbols 720c can be reduced to create more room in a viewing area of the carrousel format (see FIG. 7C). In an embodiment, a user can also fix the position of one or more of the other user/participants within a carrousel regardless of their contribution.

Thus, consistent with the present invention, a user using the GUI in the form of the symbolic overlay in, for example, an interactive television environment, can configure the overlay to change the number of depictions or iconic symbols per carrousel, vary the size of the depictions, change the color of the depictions, change avatars for each iconic symbol, change the expression of the avatars, change the webcam view of a user participant, change the number of iconic symbols in the viewing area of a carrousel, change the order of iconic symbols based on participation, or the like.

Figure 8:
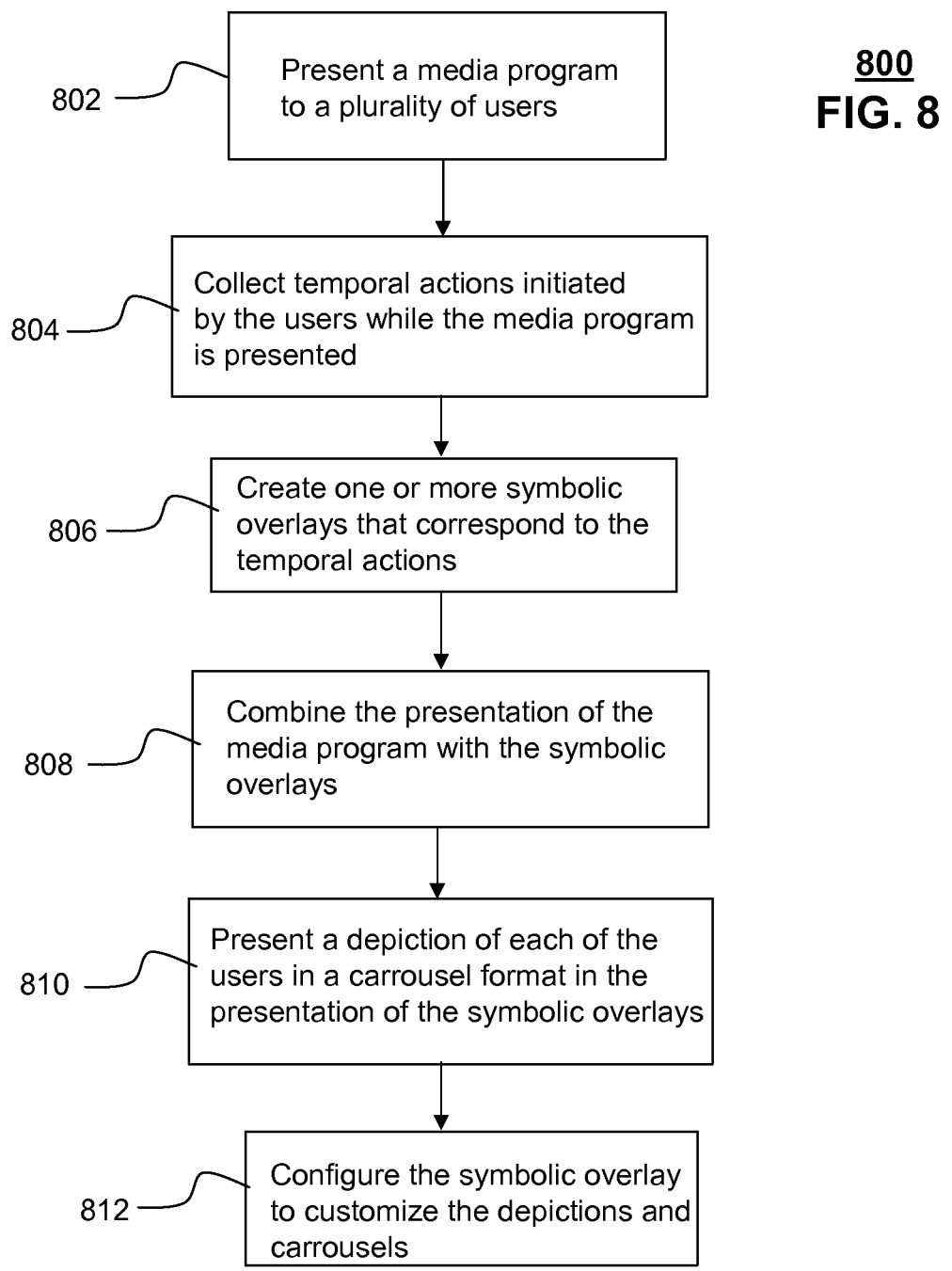
FIG. 8 depicts an illustrative embodiment of a method for transmitting media content operating in portions of the communication systems of FIGS. 1-2 and 5.

FIG. 8 depicts an illustrative embodiment of a method for transmitting media content operating in portions of the communication systems of FIGS. 1-2 and 5. For example, at step 802, each of a plurality of users is presented with a media program or media content. At step 804, the server 510, for example, collects one or more temporal actions initiated by the plurality of users while the media program is presented. At step 806, the client program included in the server 510 creates one or more symbolic overlays corresponding to the one or more temporal actions of each user. At step 808, the client program combines the presentation of the media program with a presentation of the one or more symbolic overlays. At step 810, the client program presents a depiction or iconic symbol of each of the users in a carrousel format in the presentation of the symbolic overlays. At step 812, the user/participant can configure the overlay to change the number of depictions or iconic symbols per carrousel, vary the size of the depictions, change the color of the depictions, change avatars for each iconic symbol, change the expression of the avatars, change the webcam view of a user participant, change the number of iconic symbols in the viewing area of a carrousel, change the order of iconic symbols based on participation, or the like, thereby to customize the depictions and carrousel. As noted above, changes can be done manually, automatically, or a combination thereof.

Upon reviewing the aforementioned embodiments, it would be evident to an artisan with ordinary skill in the art that said embodiments can be modified, reduced, or enhanced without departing from the scope and spirit of the claims described below. For example, the media evaluation and overlay technique is not limited to video content such as movies, but can also be applied to audio-only content, video (with no audio) content, MTV programming, or the like.

Other suitable modifications can be applied to the present disclosure without departing from the scope of the claims below. Accordingly, the reader is directed to the claims section for a fuller understanding of the breadth and scope of the present disclosure.

Figure 9:
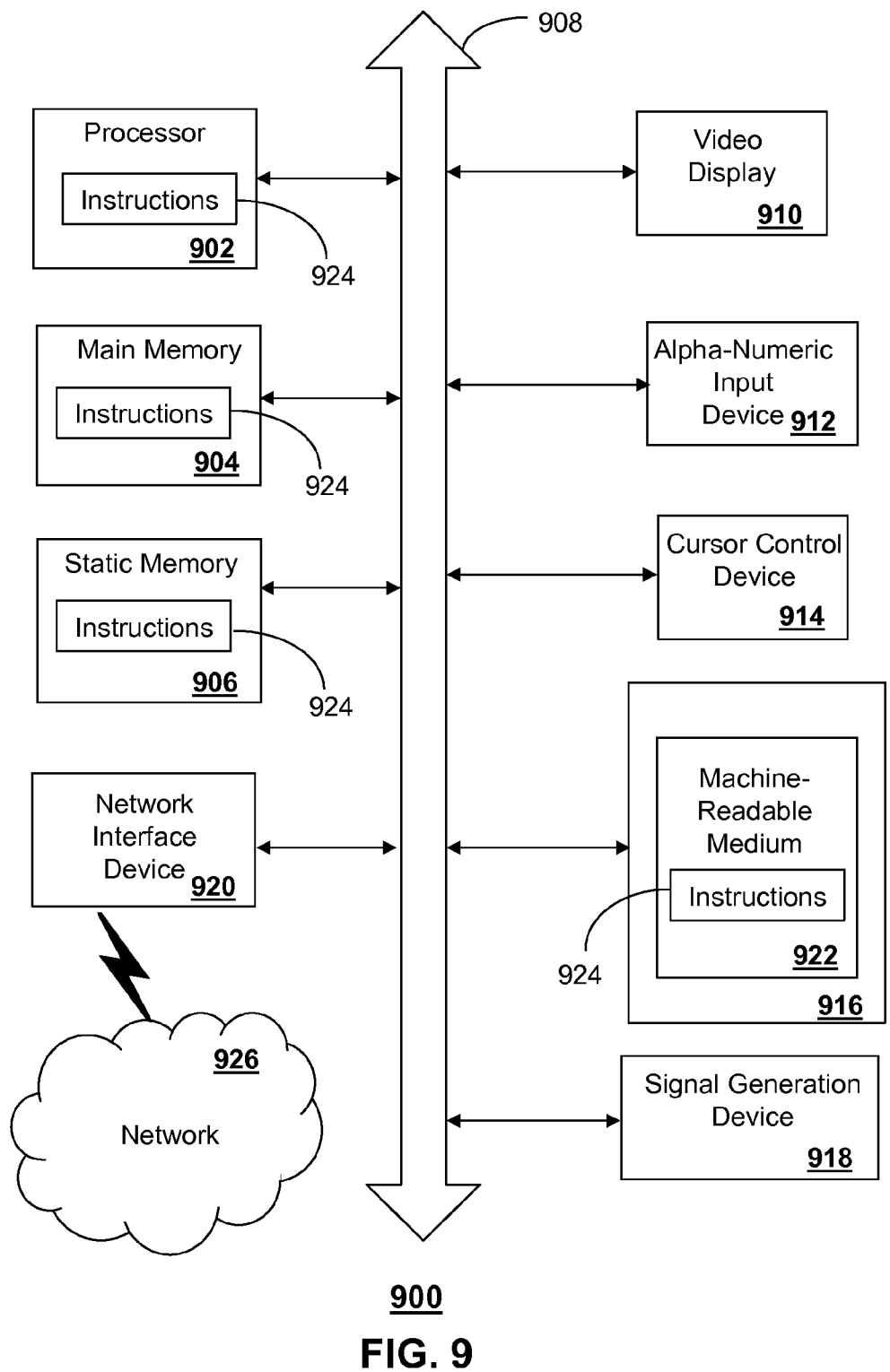
FIG. 9 is a diagrammatic representation of a machine in the form of a computer system within which a set of instructions, when executed, may cause the machine to perform any one or more of the methodologies discussed herein.

FIG. 9 depicts an exemplary diagrammatic representation of a machine in the form of a computer system 900 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 900 may include a processor 902 (e.g., a central processing unit (CPU), a graphics processing unit (GPU, or both), a main memory 904 and a static memory 906, which communicate with each other via a bus 908. The computer system 900 may further include a video display unit 910 (e.g., a liquid crystal display (LCD), a flat panel, a solid state display, or a cathode ray tube (CRT)). The computer system 900 may include an input device 912 (e.g., a keyboard), a cursor control device 914 (e.g., a mouse), a disk drive unit 916, a signal generation device 918 (e.g., a speaker or remote control) and a network interface device 920.

The disk drive unit 916 may include a machine-readable medium 922 on which is stored one or more sets of instructions (e.g., software 924) embodying any one or more of the methodologies or functions described herein, including those methods illustrated above. The instructions 924 may also reside, completely or at least partially, within the main memory 904, the static memory 906, and/or within the processor 902 during execution thereof by the computer system 900. The main memory 904 and the processor 902 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 924, or that which receives and executes instructions 924 from a propagated signal so that a device connected to a network environment 926 can send or receive voice, video or data, and to communicate over the network 926 using the instructions 924. The instructions 924 may further be transmitted or received over a network 926 via the network interface device 920.

While the machine-readable medium 922 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:

providing, by a processing system including a processor, media content at a plurality of end user devices via a graphical user interface provided at each end user device of the plurality of end user devices, wherein the graphical user interface provides an asynchronous presentation of the media content via the graphical user interface between the plurality of end user devices;

collecting, by the processing system, actions initiated by the plurality of end user devices during the presentation of the media content through the graphical user interface, the actions being associated with the presentation of the media content;

creating, by the processing system, a symbolic overlay corresponding to the actions;

combining, by the processing system, the presentation of the media content with a presentation of the symbolic overlay in the graphical user interface;

providing, by the processing system, a timeline for presentation in the graphical user interface by the plurality of end user devices, wherein the timeline includes annotations associated with the actions and is presented in the symbolic overlay along with the presentation of the media content, and wherein the timeline corresponds to a duration of the media content;

providing, by the processing system, avatars for presentation in a carrousel format by the plurality of end user devices with the presentation of the symbolic overlay in the graphical user interface, wherein the avatars correspond to users associated with the plurality of end user devices, and wherein the carrousel format presents multiple rows of carrousels to distinguish between users, and wherein the multiple rows distinguish between levels of activity of the users;

receiving, by the processing system, comments from the end user devices during the presentation of the media content; and inserting, by the processing system, the comments from the end user devices into the timeline to be associated with the media content at a time point of the media content the comments were received.

2. The method of claim 1, wherein the media content comprises video content, and wherein physical gestures of the avatars correspond to physical gestures of the users captured in images of the users.

3. The method of claim 1, wherein the carrousel format includes a live webcam image of one of the users.

4. The method of claim 1, wherein the carrousel format includes a depiction of one of the users.

5. The method of claim 1, further comprising automatically reordering the avatars in the carrousel format based on a measured participation of the users.

6. The method of claim 1, further comprising adjusting a number of the multiple rows of carrousels according to a user input.

7. The method of claim 1, further comprising:

identifying a cluster of comments among the comments within the timeline; and identifying a portion of the presentation of the media content associated with the cluster of comments.

8. The method of claim 7, further comprising:

receiving a request for an identification of frequent commentaries from one end user device of the plurality of end user devices; and providing an identification of the portion of the presentation of the media content associated with the cluster of comments to the one end user device.

9. A non-transitory, machine-readable storage medium, comprising executable instructions that, when executed by a processing system including a processor, facilitate performance of operations, comprising:

collecting actions initiated by a plurality of end user devices, the actions being associated with a presentation of media content by the plurality of end user devices via a graphical user interface provided at each end user device of the plurality of end user devices, wherein the graphical user interface provides an asynchronous display of the media content via the graphical user interface between the plurality of end user devices;

creating a symbolic overlay for the graphical user interface corresponding to the actions;

combining the presentation of the media content with a presentation of the symbolic overlay in the graphical user interface;

providing a timeline for presentation by the plurality of end user devices in the symbolic overlay in the graphical user interface, wherein the timeline includes annotations associated with the actions, and wherein the timeline corresponds to a duration of the media content;

providing avatars for presentation by the plurality of end user devices with the presentation of the symbolic overlay in the graphical user interface, wherein the avatars are provided in a carrousel format for the presentation by the plurality of end user devices with the presentation of the symbolic overlay, wherein the carrousel format presents multiple rows of carrousels to distinguish between users, and wherein the carrousel format presents the multiple rows of carrousels to distinguish a level of activity of the users; and inserting comments from the end user devices into the timeline in the graphical user interface to be associated with the media content, wherein the avatars correspond to users associated with the plurality of end user devices, and wherein physical gestures of the avatars correspond to physical gestures of the users captured in images of the users.

10. The non-transitory, machine-readable storage medium of claim 9, wherein the operations further comprise providing a live webcam image of one of the users in the carrousel format.

11. The non-transitory, machine-readable storage medium of claim 9, wherein the operations further comprise providing a still image of one of the users in the carrousel format.

12. The non-transitory, machine-readable storage medium of claim 9, wherein the operations further comprise moving an active avatar of the avatars to a different position in the graphical user interface in response to detecting a comment being provided via an active end user device of the plurality of end user devices, and wherein an active user associated with the active end user device corresponds to the active avatar.

13. The non-transitory, machine-readable storage medium of claim 9, wherein the operations further comprise automatically reordering the avatars being presented by the plurality of end user devices in a carrousel format based on a measured participation of the users.

14. A server, comprising:
a processing system including a processor; and
a memory that stores executable instructions that, when executed by the processing system, facilitate performance of operations, comprising:
- collecting commentaries initiated by a plurality of end user devices, the commentaries being associated with a presentation of media content by the plurality of end user devices via a graphical user interface presented at each end user device of the plurality of end user devices;
- creating a symbolic overlay corresponding to the commentaries to be presented in the graphical user interface during the presentation of media content at each end user device of the plurality of end user devices;
- combining the presentation of the media content with a presentation of the symbolic overlay in the graphical user interface;
- providing a timeline for presentation by the plurality of end user devices of the commentaries during the presentation of the media content in the symbolic overlay in the graphical user interface, wherein the timeline includes annotations associated with the commentaries, and wherein the timeline corresponds to a duration of the media content;
- inserting comments from the end user devices into the timeline in the graphical user interface to be associated with the media content;
- providing avatars, moving images, and still images for presentation by the plurality of end user devices with the presentation of the symbolic overlay in the graphical user interface, wherein the avatars, the moving images, and the still images correspond to users associated with the plurality of end user devices, wherein the presentation of the avatars, the moving images and the still images is in a carrousel format, and wherein the carrousel format presents multiple rows of carrousels to distinguish between users; and
- moving an active avatar of the avatars to a different position in the graphical user interface in response to detecting a comment being provided via an active end user device of the plurality of end user devices.

15. The server of claim 14, wherein the commentaries are user-generated commentaries captured at the plurality of end user devices.

16. The server of claim 14, wherein an active user associated with the active end user device corresponds to the active avatar, and
wherein the graphical user interface provides an asynchronous display of the media content via the graphical user interface between the plurality of end user devices.

17. The server of claim 14, wherein the operations further comprise automatically reordering the avatars, the moving images and the still images in a carrousel format being presented by the plurality of end user devices based on a measured participation of the users.

* * * * *